(12) United States Patent
Karato et al.

(10) Patent No.: US 7,045,578 B2
(45) Date of Patent: May 16, 2006

(54) OIL EXTENDED RUBBER AND RUBBER COMPOSITION

(75) Inventors: Takeshi Karato, Kawasaki (JP); Manabu Tomisawa, Kawasaki (JP); Takahiko Fukahori, Kawasaki (JP)

(73) Assignee: Zeon Corporation, Tokyo (JP)

( * ) Notice: Subject to any disclaimer, the term of this patent is extended or adjusted under 35 U.S.C. 154(b) by 23 days.

(21) Appl. No.: 10/471,798

(22) PCT Filed: Mar. 15, 2002

(86) PCT No.: PCT/JP02/02459

§ 371 (c)(1), (2), (4) Date: Nov. 18, 2003

(87) PCT Pub. No.: WO02/074820

PCT Pub. Date: Sep. 26, 2002

(65) Prior Publication Data

US 2004/0092645 A1  May 13, 2004

(30) Foreign Application Priority Data

Mar. 16, 2001 (JP) .............................. 2001-075635
Mar. 11, 2002 (JP) .............................. 2002-065168

(51) Int. Cl.
*C08F 236/00* (2006.01)
*C08F 236/04* (2006.01)
*C08F 236/10* (2006.01)
*C08C 19/25* (2006.01)
*C08C 19/40* (2006.01)

(52) U.S. Cl. ............................ 525/331.9; 525/333.1; 525/342; 525/385; 524/474; 524/575; 524/492

(58) Field of Classification Search ............... 524/575, 524/571, 474, 492; 525/342, 333.1, 332.1, 525/331.9, 333.3, 333.9, 232, 346, 385
See application file for complete search history.

(56) References Cited

U.S. PATENT DOCUMENTS

| 4,409,056 | A | * | 10/1983 | Takamatsu et al. | ........ | 156/334 |
| 4,553,578 | A | * | 11/1985 | Vitus et al. | .............. | 152/209.1 |
| 5,061,758 | A | * | 10/1991 | Hellermann et al. | ........ | 525/193 |
| 5,096,973 | A | * | 3/1992 | Herrmann et al. | .......... | 525/314 |
| 5,270,388 | A | * | 12/1993 | Onishi et al. | ................. | 525/89 |
| 5,612,436 | A | * | 3/1997 | Halasa et al. | ............... | 526/337 |
| 5,616,653 | A | * | 4/1997 | Hsu et al. | ................. | 525/332.5 |
| 5,798,408 | A | * | 8/1998 | Zanzig et al. | ............... | 524/505 |
| 5,905,112 | A | * | 5/1999 | Hellermann | ................ | 524/575 |
| 6,180,717 | B1 | * | 1/2001 | Kawazura et al. | ............ | 525/98 |
| 6,184,307 | B1 | * | 2/2001 | Schisla | ..................... | 525/333.1 |
| 2003/0176546 | A1 | * | 9/2003 | Hoshi et al. | ................ | 524/323 |

FOREIGN PATENT DOCUMENTS

| DE | 2 045 622 | * | 3/1971 |
| EP | 799725 A1 |  | 8/1997 |
| EP | 818 478 A1 | * | 1/1998 |
| EP | 1127909 A1 |  | 8/2001 |
| JP | 56-61413 A |  | 5/1981 |
| JP | 1-188501 A |  | 7/1989 |
| JP | 2-129241 A |  | 5/1990 |
| JP | 6-279544 A |  | 10/1994 |
| WO | WO 96/30419 A1 | * | 10/1996 |

* cited by examiner

*Primary Examiner*—David W. Wu
*Assistant Examiner*—Rip A. Lee
(74) *Attorney, Agent, or Firm*—Birch, Stewart, Kolasch & Birch, LLP

(57) ABSTRACT

An oil-extended rubber comprising a conjugated diene rubber having a specific amount of isoprene units, and an extender oil incorporated therein, characterized in that the rubber is obtained by polymerizing a monomer mixture comprising 1,3-butadiene and an aromatic vinyl monomer with the aid of an organic active metal as an initiator in a hydrocarbon medium; subsequently adding isoprene to continue polymerization, then; reacting the resulting polymer having an activated terminal with a coupling agent. A rubber composition comprising the oil-extended rubber is suitable for tread of tire having a low fuel consumption.

10 Claims, No Drawings

OIL EXTENDED RUBBER AND RUBBER COMPOSITION

This application is the national phase under 35 U.S.C. § 371 of PCT International Application No. PCT/JP02/02459 which has an International filing date of Mar. 15, 2002, which designated the United States of America.

TECHNICAL FIELD

This invention relates to an oil-extended rubber and a rubber composition. More particularly, it relates to an oil-extended rubber which, when silica is incorporated therewith, gives a rubber vulcanizate exhibiting highly reduced heat build-up, and having good wet grip property and good abrasion resistance.

BACKGROUND ART

Automobile tires are required to have specific properties such that, firstly, automobiles exhibit a low fuel consumption rate, i.e., a long distance travel can be obtained with a low fuel consumption; secondly, the tires exhibit good wet grip property, i.e., braking distance on a wet road is short; and thirdly, the tires have good abrasion resistance, i.e., the surface of tire is not readily abraded.

In recent years, a serious view has been taken of environmental protection and saving in resources consumption, and thus, automobile tires with a low fuel consumption rate are severely required. To provide a tire with satisfactorily low fuel consumption rate, it is generally effective to use a rubber material capable of giving a rubber vulcanizate exhibiting a low heat build-up, i.e., in which heat is not readily built up.

As rubbers for tires, natural rubber (NR), polybutadiene (BR), polyisoprene (IR) and a styrene-butadiene copolymer rubber (SBR) are popularly used. Usually, rubber compositions comprising these rubbers having carbon black incorporated therein are used as a rubber material for tire. However, such rubber compositions containing carbon black are unsatisfactory in low heat build-up.

Incorporation of silica instead of carbon black in the rubber compositions has been proposed to improve the low heat build-up. However, silica-incorporated rubber compositions have a poor abrasion resistance as compared with carbon black-incorporated rubber compositions. This would be due to the fact that silica has poor affinity for rubber as compared with carbon black, and a satisfactory reinforcing effect cannot be obtained with silica.

To improve the low heat build-up, a proposal has been made wherein a coupled polymer is used as a rubber composition, which polymer is prepared by coupling living polymers having an activated terminal, prepared by polymerization using an organolithium catalyst, with a coupling agent such as tin tetrachloride. For example, a coupled polymer has been proposed in Japanese Unexamined Patent Publication No. S57-55912 which is comprised of styrene units and butadiene units, and has a bond between a butadienyl group and at least one metal selected from silicon, germanium, tin and lead, and has a high vinyl bond content. This coupled polymer gives a rubber composition exhibiting a somewhat improved low heat build-up when carbon black is incorporated therein, but, gives a rubber composition exhibiting only very slightly improved low heat build-up and a poor abrasion resistance when silica is incorporated therein.

Another proposal has been made in Japanese Unexamined Patent Publication No. H7-292161 which discloses a rubber composition for use in a tire tread, which rubber composition comprises an oil-extended rubber comprising a specific styrene-butadiene copolymer rubber prepared by a solution copolymerization using an organolithium catalyst, and further comprises silica, carbon black, a silane coupling agent and a vulcanizing agent. This rubber composition exhibits improved low heat build-up and improved abrasion resistance as compared with a rubber composition containing only carbon black as a reinforcer.

Still another proposal has been made in International Publication No. WO 96/30419, which discloses a styrene-butadiene-isoprene random copolymer rubber containing 0.5 to 10% by weight of isoprene. This copolymer rubber gives a rubber composition exhibiting, when silica is incorporated therein, good low heat build-up and good abrasion resistance as compared with a rubber composition having no isoprene units, but exhibiting only slightly improved balance among the low heat build-up, wet grip property and abrasion resistance, as compared with a rubber composition comprising a butadiene-styrene copolymer rubber having no isoprene units.

DISCLOSURE OF THE INVENTION

An object of the present invention is to provide an oil-extended rubber which, when silica is incorporated therewith, gives a rubber vulcanizate exhibiting low heat build-up, and having good wet grip property and good abrasion resistance; and further provide a rubber composition comprising the oil-extended rubber; and a rubber vulcanizate obtained by crosslinking the rubber composition.

The present inventors made extensive researches to solve the above-mentioned problems of the prior art, and found that an oil-extended rubber composition comprising a specific coupled polymer having oil incorporated therewith gives, when silica is incorporated in the oil-extended rubber composition as a reinforcer, a rubber vulcanizate exhibiting low heat build-up, and having good wet grip property and good abrasion resistance, which coupled polymer is obtained by a process wherein 1,3-butadiene and styrene are copolymerized by using an organolithium catalyst in a hydrocarbon medium; a specific amount of isoprene is added to continue polymerization; and then, the resulting polymer is reacted with a silicon-containing coupling agent. The present invention has been completed based on this finding.

In accordance with the present invention, there is provided an oil-extended rubber comprising a conjugated diene rubber comprising 30 to 99.9% by weight of 1,3-butadiene units, 0.1 to 10% by weight of isoprene units and 0 to 60% by weight of aromatic vinyl monomer units, and an extender oil; characterized in that the conjugated diene rubber is obtained by a process wherein a monomer mixture comprising at least 80% by weight of 1,3-butadiene based on the total amount of 1,3-butadiene used for polymerization, not larger than 80% by weight of isoprene based on the total amount of isoprene used for polymerization, and at least 80% by weight of an aromatic vinyl monomer based on the total amount of the aromatic vinyl monomer used for polymerization is polymerized by using an organic active metal as an initiator in a hydrocarbon medium; the remainder of isoprene is added to continue polymerization, then; the remainder of 1,3-butadiene and the remainder of aromatic vinyl monomer are added thereto to continue polymerization; and then, the resulting living polymer having an activated terminal is reacted with a coupling agent.

In accordance with the present invention, there is further provided a rubber composition comprising the above-mentioned oil-extended rubber.

BEST MODE FOR CARRYING OUT THE INVENTION

The present invention will be described in detail.

The oil-extended rubber of the present invention comprises a conjugated diene rubber comprising 30 to 99.9% by weight of 1,3-butadiene units, 0.1 to 10% by weight of isoprene units and 0 to 60% by weight of aromatic vinyl monomer units, and have incorporated therein an extender oil. The oil-extended rubber is characterized in that the conjugated diene rubber is obtained by a process wherein a monomer mixture comprising at least 80% by weight of 1,3-butadiene based on the total amount of 1,3-butadiene used for polymerization, not larger than 80% by weight of isoprene based on the total amount of isoprene used for polymerization, and at least 80% by weight of an aromatic vinyl monomer based n the total amount of the aromatic vinyl monomer used for polymerization is polymerized by using an organic active metal as an initiator in a hydrocarbon medium; the remainder of isoprene is added to continue polymerization, then; the remainder of 1,3-butadiene and the remainder of aromatic vinyl monomer are added thereto to continue polymerization; and then, the resulting living polymer having an activated terminal is reacted with a coupling agent.

The conjugated diene rubber constituting the oil-extended rubber comprises 30 to 99.9% by weight, preferably 45 to 96.8% by weight and more preferably 50 to 89.7% by weight of 1,3-butadiene units, 0.1 to 10% by weight, preferably 0.2 to 5% by weight and more preferably 0.3 to 4% by weight of isoprene units and 0 to 60% by weight, preferably 3 to 50% by weight and more preferably 10 to 45% by weight of aromatic vinyl monomer units. If the amount of 1,3-butadiene units in the conjugated diene rubber is too small, a rubber vulcanizate has large heat build-up and poor wet grip property. In contrast, if the amount of 1,3-butadiene units is too large, a rubber vulcanizate has poor abrasion resistance. If the amount of isoprene units in the conjugated diene rubber is too small, a rubber vulcanizate has large heat build-up, poor wet grip property and poor abrasion resistance. If the amount of isoprene units is too large, a rubber vulcanizate has large heat build-up and poor abrasion resistance. If the amount of aromatic vinyl monomer units in the conjugated diene rubber is too large, a rubber vulcanizate has large heat build-up and poor abrasion resistance. Aromatic vinyl monomer units are preferably contained in the conjugated diene rubber in view of more well-balanced wet grip property and abrasion resistance.

The 1,3-butadiene units in the conjugated diene rubber usually has a vinyl bond content of at least 5% by weight, preferably 10 to 90% by weight, more preferably 15 to 80% by weight and especially preferably 20 to 70% by weight. If the vinyl bond content is too small, the polymer is difficult to produce, and a silica-incorp rated rubber composition tends to have poor processability. In contrast, if the vinyl bond content is too large, the polymer is also difficult to produce and a rubber vulcanizate is liable to possess poor abrasion resistance.

As specific examples of the aromatic vinyl monomer, there can be mentioned styrenes; alkyl-substituted styrenes such as α-methylstyrene, 2-methylstyrene, 3-methylstyrene, 4-methylstyrene, 2,4-diisopropylstyrene, 2,4-di-methylstyrene, 4-t-butylstyrene and 5-t-butyl-2-methylstyrene; and N,N-disubstituted aminostyrenes such as N,N-dimethylaminomethylstyrene, N,N-diethylaminomethylstyrene, N,N-dimethylaminoethylstyrene, N-methyl-N-ethylaminoethylstyrene, N,N-diethylaminothylsttyrene, N,N-dipropylaminoethylstyrene and N,N-dioctylaminoethylstyrene. Of these, styrene is preferable. These aromatic vinyl monomers may be used either alone or as a combination of at least two thereof.

Provided that the effect of the present invention can be substantially obtained, the conjugated diene rubber used in the invention may comprise monomer units, other than 1,3-butadiene units, isoprene units and aromatic vinyl monomer units. As specific examples of the monomer for such monomer units other than 1,3-butadiene units, isoprene units and aromatic vinyl monomer units, there can be mentioned ethylenically unsaturated carboxylic acid ester monomers such as isopropyl acrylate, isopropyl methacrylate, n-butyl acrylate, t-butyl acrylate and t-butyl methacrylate; olefin monomers such as ethylene, propylene, isobutylene and vinylcyclohexane; and non-conjugated diene monomers such as 1,4-pentadiene and 1,4-hexadiene. The amount of these monomer units in the conjugated diene polymer is preferably not larger than 20% by weight and more preferably not larger than 10% by weight.

The conjugated diene rubber preferably has a weight average molecular weight (Mw) in the range of 200,000 to 2,000,000, more preferably 500,000 to 1,500,000. When Mw is in this range, a rubber composition has good processability, and a rubber vulcanizate has lower heat build-up property and better abrasion resistance.

The ratio (Mw/Mn) of Mw to number average molecular weight (Mn) of the conjugated diene rubber is preferably in the range of 1.5 to 3. When Mw/Mn is in this range, a rubber composition has good processability, and a rubber vulcanizate has lower heat build-up property and better abrasion resistance.

The conjugated diene rubber used in the present invention is obtained by a process wherein a monomer mixture comprising at least 80% by weight of 1,3-butadiene based on the total amount of 1.,3-butadiene used for polymerization, not larger than 80% by weight of isoprene based on the total amount of isoprene used for polymerization, and at least 80% by weight of an aromatic vinyl monomer based on the total amount of the aromatic vinyl monomer used for polymerization is polymerized by using an organic active metal as an initiator in a hydrocarbon medium; the remainder of isoprene is added to continue polymerization, then; the remainder of 1, 3-butadiene and the remainder of aromatic vinyl monomer are added thereto to continue polymerization; and then, the resulting living polymer having an activated terminal is reacted with a coupling agent.

As specific examples of the hydrocarbon medium, there can be mentioned aliphatic hydrocarbons such as butane, pentane, hexane and 2-butene; alicyclic hydrocarbons such as cyclopentane, cyclohexane and cyclohexene; and aromatic hydrocarbons such as benzene, toluene and xylene. The amount of hydrocarbon medium is such that the concentration of monomers is usually in the range of 1 to 50% by weight and preferably 10 to 40% by weight.

The organic active metal preferably includes an organic alkali metal compounds, and, as specific examples thereof, there can be mentioned organo-monolithum compounds such as n-butyllithium, s c-butyllithium, t-butyllithium, hexyllithium, phenyllithlum and stilbenelithium; organic polyvalent lithium compounds such as dilthiomethane, 1,4-dilithiobutane, 1,4-dilithio-2-ethylcyclohexane and 1,3,5-trilithiobenzenes; organic sodium compounds such as sodium naphthalene; and organic potassium compounds such as potassium naphthalene. Of these, organic lithium compounds are preferable. Organo-monolithium compounds are especially preferable. These organic active metals may be used either alone or as a combination of at least two thereof. The amount of organic active metal used is preferably in the range of 1 to 20 milli-mol, more preferably 2 to 15 milli-mol, per 1,000 g of the monomer mixture.

To adjust the vinyl bond content in the 1,3-butadiene units to a desired value, a polar compound may be added at polymerization. The polar compound used includes, for example, ether compounds such as dibutyl ether and tetrahydrofuran: tertiary amines such as tetraethylethylenediamine; alkali metal alkoxides: and phosphine compounds. Of these, ether compounds and tertiary amines are preferable. Tertiary amines are especially preferable. The amount of polar compound used is preferably in the range of 0.01 to 100 mol, more preferably 0.3 to 30 mol, per mol of the organic active metal. When the amount of polar compound is within this range, the adjustment of the vinyl bond content in the 1,3-butadiene units can be easily effected, and troubles caused by deactivation of the catalyst are minimized.

The amounts of the monomers used for polymerization can be appropriately chosen so that a conjugated diene rubber containing the desired amounts of monomer units is finally obtained.

The conjugated diene rubber is obtained by a process wherein a monomer mixture comprising at least 80% by weight, preferably at least 90% by weight and more preferably at lesat 95% by weight of 1,3-butadiene based on the total amount of 1,3-butadiene used for polymerization, not larger than 80% by weight, preferably not larger than 70% by weight and more preferably not larger than 60% by weight of isoprene based on the total amount of isoprene used for polymerization, and at least 80% by weight, preferably at least 90% by weight and more preferably at least 95% by weight of an aromatic vinyl monomer based on the total amount of the aromatic vinyl monomer used for polymerization is polymerized in the initial polymerization stage; the remainder of isoprene is added to continue polymerization, then; the remainder of 1,3-butadiene and the remainder of aromatic vinyl monomer are added thereto to continue polymerization; and then, the resulting living polymer having an activated terminal is reacted with a coupling agent.

If the amount of 1 3-butadiene or aromatic vinyl monomer used in the initial polymerization stage is too small, a rubber vulcanizate has large heat build-up and poor abrasion resistance. If the amount of isoprene used in the initial polymerization stage is too large, a rubber vulcanizate has large heat build-up and poor abrasion resistance. In the initial polymerization stage, a monomer mixture comprising 1,3-butadiene, isoprene and aromatic vinyl monomer is preferably continuously added to continue polymerization, with a progress of polymerization so that a polymer having random bonds formed among 1,3-butadiene and isoprene, and aromatic vinyl monomer is produced.

After the initial polymerization stage, the remainder of isoprene is added to continue polymerization. It is important in this polymerization stage that a chain consisting of only isoprene units is formed during polymerization. Therefore, it is preferable that the remainder of isoprene is added after the initial stage polymerization has been substantially completed. The remainder of isoprene added is preferably an amount in the range of 0.2 to 5% by weight, more preferably 0.3 to 4% by weight, based on th total amount of the monomers used for polymerization.

When 100% by weight of 1,3-butadiene and 100% by weight of aromatic vinyl monomer are not used in the initial polymerization stage, the remainder of isoprene is added to continue polymerization after the initial polymerization stage, and then, the remainder of 1,3-butadiene and the remainder of aromatic vinyl monomer are added to further continue polymerization. The remainder of 1, 3-butadiene and the remainder of aromatic vinyl monomer are added preferably in a manner such that a monomer mixture comprising 1,3-butadiene and aromatic vinyl monomer is continuously added with a progress of polymerization so that a polymer having random bonds formed between 1,3-butadiene and isoprene is produced.

The polymerization is preferably carried out at a temperature of −78 to 150° C. by a continuous or batch-wise polymerization procedure. A batch-wise polymerization procedure is especially preferable.

The polymer having an activated terminal (hereinafter abbreviated to "living polymer" when appropriate), obtained by completion of the above-mentioned polymerization, is reacted with a coupling agent to give a conjugated diene rubber. In the case when the reaction rate of the living polymer with a coupling agent is much slower than the reaction rate of the living polymer with monomers, the coupling agent may be added to a polymerization system wherein unreacted monomers remain.

The polymer before the reaction thereof with a coupling agent preferably has a weight average molecular weight (Mw) in the range of 5,000 to 2,000,000, more preferably 50,000 to 700,000 and especially preferably 150,000 to 500,000. If Mw is too small, a rubber vulcanizate exhibits large heat build-up and has poor abrasion resistance. In contrast, if Mw Is too large, a rubber composition tends to have poor processability.

The ratio (Mw/Mn) of Mw of the polymer before the reaction thereof with a coupling agent to the number average molecular weight thereof (Mn) is preferably in the range of 1.02 to 3, more preferably 1.05 to 2.5 and especially preferably 1.1 to 2. If this ratio is too large, a rubber vulcanizate tends to exhibit large heat build-up. In contrast, if the ratio is too small, the polymer is difficult to prepare and a rubber composition tends to have poor processability.

The coupling agent includes, for example, a silicon-containing coupling agent, a tin-containing coupling agent, a phosphorus-containing coupling agent, an epoxy group-containing coupling agent, an isocyanate group-containing coupling agent, an ester group-containing coupling agent, an alkenyl group-containing coupling agent and a halogenated hydrocarbon. Of these, a silicon-containing coupling agent, an epoxy group-containing coupling agent and an isocyanate group-containing coupling agent are preferable. A silicon-containing coupling agent and an epoxy group-containing coupling agent are especially preferable.

As specific examples of the silicon-containing coupling agent, there can be mentioned alkoxysilane compounds such as tetramethoxyslane, tetraethoxysilane, tetrabutoxyslane and alkyltriphenoxysilane; halogenated silane compounds such as tetrachlorosilane, tetrabromosilane, tetraiodosilane, monomethyl-trichlorosilane, monoethyl-trichlorosilane, monobutyl-trichlorosilane, monohexyl-trichlorosilane, monomethyl-tribromosilane and bistrichlorosilyletahne; and alkoxy-halogenated silane compounds such as monochloro-trimethoxysilane, monobromo-trimethoxysilane, dichloro-dimethoxysilane, dibromo-dimethoxysilane, trichloro-methoxysilane and tribromo-methoxysilane. Of these, alkoxysilane compounds and halogenated silane compounds are preferable. Tetramethoxysilane and tetrachlorosilane are especially preferable.

As specific examples of the tin-containing coupling agent, there can be mentioned halogenated tin compounds such as tin tetrachloride, tin terabromide, monomethyltin trichloride, monoethyltin trichloride, monobutyltin trichloride, monohexyltin trichloride and bis-trichlorostannylethane; and alkoxytin compounds such as tetramethoxytin, tetraethoxytin and tetrabutoxytin, As specific examples of the phosphorus-containing coupling agent, there can be mentioned tris-nonylphenyl phosphite, trimethyl phosphite and triethyl phosphite.

As specific examples of the epoxy group-containing coupling agent, there can be mentioned tetraglyoidyl-1,3-bisaminomethylcyclohexane, tetraglycidyl-1,3-bisaminomethylbenzene, epoxy-modified silicone, epoxidized soybean oil and epoxidized linseed oil. Of these, tetraglycidyl-1,3-bisaminomethyloyclohexane is preferable.

As specific examples of the isocyanate group-containing coupling agent, there can be mentioned 2,4-tolylene diisocyanate, 2,6-tolylene diisocyanate, diphenylmethane dilsocyanate, diphenylethane diisocyanate and 1,3,5-benzenetriisocyanate. Of these, 2,4-tolylene diisocyanate is preferable.

As specific examples of the ester group-containing coupling agent, there can be mentioned dimethyl adipate, dimethyl terephthalate, diethyl terephthalate, dimethyl phthalate and dimethyl isophthalate.

As specific examples of the halogenated hydrocarbon, there can be mentioned chloroform, tribromomethane, trichloroethane, trichloropropane, tribromopropane, carbon tetrachloride and tetrachlorethane.

These coupling agents may be used either alone or as a combination of at least two thereof.

The amount of coupling agent can be appropriately chosen depending upon the desired weight average molecular weight, the coupling percentage and the reactivity of coupling agent, but, is preferably in the rang of 0.1 to 10 mol equivalent based on the organic active metal.

By the term "coupling percentage" as used herein is meant a ratio (in % by weight) of the weight of a coupled polymer produced by coupling two or more living polymer molecules with one molecule of coupling agent, to the total weight of polymers. The weight ratio can be measured by gel permeation chromatography.

The coupling percentage of the conjugated diene rubber is preferably at least 10% by weight, more preferably in the range of 30 t 90% by weight and especially preferably 55 to 80% by weight. When the coupling percentage is too small, a rubber composition is liable to have poor processability and a rubber vulcanizate tends to exhibit large heat build-up and have poor abrasion resistance.

The coupling reaction is carried out preferably under conditions such that the temperature is in the range of 0 to 150° C. and the time is in the range of 0.5 to 20 hours.

After the reaction of a polymer having an activated terminal with a coupling agent, an unreacted polymer having an activated terminal may be reacted with a modifier to introduce a modifying group to the activated terminal to give a conjugated diene rubber containing a terminal-modified polymer.

As specific examples of the modifier, there can be mentioned N,N-di-substituted aminoalkylacrylamide compounds and N,N-di-substituted aminoalkylmethacrylamide compounds such as N,N-dimethylaminopropylacrylamide and N,N-dimethylaminopropylmethaacrylamide; N,N-disubstituted amino aromatic compounds such as N,N-dimethylaminoethyl-styrene and N,N-diethylaminoethylstyrene; N-substituted cyclic amides such as N-methyl-2-pyrrolidone, N-vinyl-2-pyrrolidone, N-phenyl-2-pyrrolidone and N-methyl-ε-caprolactam; N-substituted cyclic ureas such as 1,3-dimethylethylene urea and 1,3-diethyl-2-imidazolidinone; and N-substituted aminoketones such as 4,4'-bis-(dimethylamino) b nzophenone and 4,4'-bis (diethylamino)-benzophenone.

After completion of polymerization, a coupling reaction is carried out and then a polymerization stopper may be added to terminate the polymerization reaction. As the polymerization stopper, alcohols such as methanol and ethanol, and water are usually used. Alcohols are preferably used.

According to the need, antioxidant may be added to a resultant polymer solution, which includes, for example, a phenolic antioxidant, phosphorus-containing antioxidant and a sulfur-containing antioxidant. The amount of antioxidant may be appropriately chosen depending upon the particular kind of antioxidant and other conditions. Further, an extender oil may be added, if desired.

A known procedure can be adopted for recovering a polymer from the polymer solution. For example, a procedure can be adopted wherein a solvent is removed, for example, by steam stripping, then, the solid is filtered and then dried to give a solid rubber.

The oil-extended rubber of the present invention comprises the above-mentioned conjugated diene rubber having incorporated therein an extender oil.

As the extender oil to be incorporated in the conjugated diene rubber, those which have a total acid value, as measured according to JIS K2501 (potentiometric titration method), of not larger than 2 mgKOH/g, preferably not larger than 1 mgKOH/g and more preferably not larger than 0.5 mgKOH/g are usually used. When an extender oil having a too large total acid value is added, a rubber vulcanizate tends to exhibit large heat build-up and have poor abrasion resistance, and its use is restricted.

The extender oil preferably has a pour point in the range of −50° C. to +70° C., more preferably −30° C. to +50° C. and especially preferably −20° C. to +20° C. If the pour point is too low, abrasion resistance is liable to be poor. In contrast, if the pour point is too high, the extender oil is difficult to transport and a rubber vulcanizate tends to exhibit large heat build-up.

The extender oil preferably has an aromatic carbon content (CA %; as measured according to ASTM D3238) of at least 5%, more preferably at least 15%, and a paraffin carbon content (CP%) of not larger than 70%, more preferably not larger than 60% and especially preferably not larger than 50%. If the CA % is too small or CP % is too large, tensile strength and abrasion resistance of a rubber vulcanizate are liable to be poor. Further, the extender oil preferably has a polycyclic aromatic content (as measured by IP 346 method) of smaller than 3.

The amount of extender oil is preferably in the range of 5 to 100 parts by weight, more preferably 10 to 80 parts by weight and especially preferably 15 to 60 parts by weight, based on 100 parts by weight of the conjugated diene rubber. When the amount of extender oil is within this range, a rubber vulcanizate is well balanced between low heat build-up and good abrasion resistance.

The extender oil preferably has a Mooney viscosity in the range of 20 to 100, more preferably 30 to 80 and especially preferably 40to 70. When the Mooney viscosity is within this range, a rubber composition has good processability and a rubber vulcanizate has well balanced physical properties.

The oil-extended rubber of the present invention can be produced by a method wherein the above-mentioned conjugated diene rubber is recovered as solid rubber, and then an extender oil is Incorporated with the solid rubber, and the mixture is mechanically kneaded; or a method wherein a predetermined amount of extender oil is incorporated in the solution of conjugated diene rubber, and then a solid oil-extended rubber is recovered. The latter method is preferable because the extender oil can be uniformly incorporated by a simple method.

The rubber composition of the present invention comprises the above-mentioned oil-extended rubber.

The rubber composition of the present invention may further comprise rubber other than the above-mentioned conjugated diene rubber. As specific examples of such rubber, there can be mentioned natural rubber (NR), polyisoprene rubber (IR), emulsion-polymerized SBR (styrene-butadiene copolymer rubber), solution-polymerized random SBR (bound styrene content: 5 to 50% by weight; 1,2-bond content in the butadiene units: 10 to 80%), high trans SBR (trans bond content in the butadiene units: 70 to 95%), low cis BR (polybutadiene rubber), high cis BR, high trans BR (trans bond content in the butadiene units: 70 to 95%), styrene-isoprene copolymer rubber, butadiene-isoprene copolymer rubber, emulsion-polymerized styrene-acrylonitrile-butadiene copolymer rubber, acrylonitrile-butadiene copolymer rubber, high vinyl SBR-low vinyl SBR block copolymer rubber, polyisoprene-SBR block copolymer rubber, polystyrene-polybutadiene-polystyrene block copolymer rubber, acrylic rubber, epichlorohydrin rubber, fluororubber, silicone rubber, ethylene-propylene rubber and urethane rubber. Of these, Nr, BR, IR and SBR are preferable. These rubbers may be used either alone or as a combination of at least two thereof.

In the case when the rubber composition of the present invention comprises rubber in addition to the conjugated diene rubber, the amount of the conjugated diene rubber is preferably at least 10% by weight, more preferably 20 to 90% by weight and especially preferably 30 to 80% by weight, based on the total weight of rubber ingredients. If the relative amount of the conjugated diene rubber is too small, sufficiently improved properties cannot be obtained.

The rubber composition of the present invention preferably comprises silica.

The silica includes, for example, dry process white carbon, wet process white carbon, colloidal silica, and precipitated silica as described in Japanese Unexamined Patent Publication No. S62-62838. Of these, wet process white carbon which is predominantly comprised of hydrated silicate is preferable. Carbon-silica dual phase fill r which has silica supported on carbon black surface may also be used. These silica may be used either alone or as a combination of at least two thereof.

Silica preferably has a nitrogen adsorbed specific surface area, as measured by the BET method according to ASTM D3037, of 50 to 400 $m^2/g$, more preferably 100 to 220 $m^2/g$. When the nitrogen adsorbed specific surface area of silica is within this range, a rubber vulcanizate exhibits more reduced heat build-up and more enhanced abrasion resistance. Silica preferably a pH value of smaller than 7, more preferably in the range of S to 6.9. The amount of silica is preferably in the range of 10 to 150 parts by weight, more preferably 20 to 120 parts by weight and especially preferably 40 to 100 parts by weight, based on 100 parts by weight of the total rubbers.

A silane coupling agent may be incorporated in the rubber composition to give a rubber vulcanizate having more reduced heat build-up and more enhanced abrasion resistance. As specific examples of the silane coupling agent, there can be mentioned vinyltrlethoxysilane, β-(3,4-epoxycyclohexyl) ethyltrimethoxysilane, N-(β-aminoethyl)-γ-aminopropyltrimethoxysilane, bis(3-(triethoxysilyl)propyl) tetrasulfide, bis(3-(triethoxysilyl)propyl)disulfide, and tetrasulfides as described in Japanese Unexamined Patent Publication No. H6-248116 such as γ-trimethoxysilylpropyldimethylthiocarbamyl tetrasulfide and trimethoxysilylpropylbenzothiazyl tetrasulfide. Of these, tetrasulfides are preferable. These silane coupling agents may be used either alone or as a combination of at least two thereof. The amount of silane coupling agent is preferably in the range of 0.1 to 30 parts by weight, more preferably 1 to 15 parts by weight, based on 100 parts by weight of silica.

The rubber composition of the present invention may comprise carbon black such as furnace black, acetylene black, thermal black, channel black and graphite. Of these, furnace black is preferable, and, as specific examples of the carbon black, there can be mentioned SAF, ISAF, ISAF-HS, ISAF-LS, IISAF-HS, HAF, HAF-HS and FEF. These carbon blacks may be used either alone or as a combination of at least two thereof.

The carbon black preferably has a nitrogen adsorption specific surface area ($N_2SA$) of 5 to 200 $m^2/g$, more preferably 80 to 130 $m^2/g$, and preferably has a dibutyl phthalate (DBP) adsorption of 5 to 300 ml/100g, more preferably 80 to 160 ml/100g. When the nitrogen adsorption specific surface area and the DBP adsorption are within these ranges, a rubber vulcanizate has excellent mechanical strength and abrasion resistance.

As the carbon black, high structure carbon black having a cetyltrimethylammonium bromide (CTAB) adsorption specific surface area, as described in Japanese Unexamined Patent Publication No. H5-230290, of 110 to 170 $m^2/g$, and a DBP adsorption (24M4DBP), as measured after applying four times-repeated commpression force at a pressure of 165 MPa, of 110 to 130 ml/100g can also be preferably used. By using this high structure carbon black, abrasion resistance of a rubber vulcanizate is further enhanced.

The amount of carbon black is usually not larger than 150 parts by weight based on 100 parts by weight of the total rubbers. The total amount of silica and carbon black is preferably in the range of 10 to 150 parts by weight based on 100 parts by weight of the total rubbers.

In addition to the above-mentioned ingredients, desired amounts of other conventional ingredients such as a crosslinking agent, a crosslinking accelerator, an accelerator activator, an antioxidant, an activator, a process oil, a plasticizer, a lubricant and a filler can be incorporated in the rubber composition of the present invention.

As specific examples of the crosslinking agent, there can be mentioned sulfur such as powdery sulfur, precipitated sulfur, colloidal sulfur, insoluble sulfur and highly dispersible sulfur; halogenated sulfur such as sulfur monochloride and sulfur dichloride, organic peroxides such as dicumyl peroxide and di-t-butyl peroxide; quinone dioximes such as p-quinone dioxime and p,p'-dibenzoylquinone dioxime; organic polyamine compounds such as triethylenetetramine, hexamethylenediamine carbamate and 4,4'-methylenebis-o-chloraniline; and alkylphenol resins having a methylol group. Of these, sulfur is preferable. Powdery sulfur is especially preferable. These crosslinking agents may be used either alone or as a combination of at least two thereof.

The amount of crosslinking agent is preferably in the range of 0.1 to 15 parts by weight, more preferably 0.5 to 5 parts by weight, based on 100 parts by weight of the total rubber ingredients.

As specific examples of the crosslinking accelerator, there can be mentioned sulfenamide crosslinking accelerators such as N-cyclohexyl-2-benozothizolsulfenamide, N-t-butyl-2-benozothizolsulfenamide, N-oxyethylene-2-benozothizolsulfenamide and N,N'-diisopropyl-2-benozothizolsulfenamide; guanidine crosslinking accelerators such as diphenylguanidine, diorthotolyl-guanidine and orthotolyl-biguanidine; thiourea crosslinking accelerators such as diethylthiourea; thiazole crosslinking accelerators such as 2-mercaptobenzothiazole, dibenzothlazyl disulfide and 2-mercaptobenzothiazole zinc salt; thiuram crosslinking accelerators such as tetramethylthiuram monosulfide and tetramethylthiuram disulfide, dithiocarbamate crosslinking accelerators such as sodium dimethyldithiocarbamate and zinc diethyldithiocarbamate; and xanthogenate crosslinking accelerators such as sodium isopropylxanthogenate, zinc isopropylxanthogenate and zinc butylxanthogenate. Of these, sulfenamide crosslinking accelerators are preferable.

The crosslinking accelerator may be used either alone or as a combination of at least two thereof. The amount of crosslinking accelerator is preferably in the range of 0.1 to 15 parts by weight, more preferably 0.5 to 5 parts by weight, based on 100 parts by weight of the total rubber ingredients.

As specific examples of the accelerator activator, there can be mentioned higher fatty acids such as stearic acid, and zinc oxide. The zinc oxide preferably has high surface activity with a particle diameter of not larger than 5 μm, and, as specific examples thereof, there can be mentioned active zinc white having a particle diameter in the range of 0.05 to 0.2 μm, and zinc white having a particle diameter in the range of 0.3 to 1 μm. The zinc oxide may be surface-treated with an amine dispersant or a wetting agent.

The amount of crosslinking accelerator is appropriately chosen. For example, the amount of higher fatty acid is preferably in the range of 0.05 to 15 parts by weight, more preferably 0.5 to 5 parts by weight, based on 100 parts by weight of the total rubber ingredients. The amount of zinc oxide is preferably in the range of 0.05 to 10 parts by weight, more preferably 0.5 to 3 parts by weight, based on 100 parts by weight of the total rubber ingredients.

The process oil includes mineral oil and synthetic oil. As the mineral oil, aromatic oil, naphthene oil and paraffin oil are usually used.

As other ingredients, activators such as diethylene glycol and polyethylene glycol; fillers such as calcium carbonate, talc and clay; tackifiers such as petroleum resin and coumarone resin; and wax can be incorporated in the rubber composition.

The rubber composition of the present invention can be prepared by kneading together the respective ingredients according to the conventional procedure. For example, the oil-extended rubber and ingredients, other than a crosslinking agent and a crosslinking accelerator, are first kneaded together, and then, a crosslinking agent and a crosslinking accelerator are added to the kneaded mixture to obtain the rubber composition The first kneading of the oil-extended rubber and ingredients other than a crosslinking agent and a crosslinking accelerator is preferably carried out at a temperature of 80° C. to 200° C., more preferably 120° C. to 180° C., and preferably for a time of 30 seconds to 30 minutes. The kneading of a crosslinking agent and a crosslinking accelerator with the first-kneaded mixture is usually carried out after the kneaded mixture is cooled to a temperature of not higher than 10020 0 C., preferably not higher than 80° C.

The rubber composition of the present invention is usually used as a rubber vulcanizate.

The procedure for crosslinking the rubber composition is not particularly limited, and can appropriately be chosen depending upon the shape and size of rubber vulcanizate. A vulcanizable rubber composition can be filled in a mold and heated whereby molding and crosslinking are concurrently carried out, or an uncrosslinked rubber composition can be previously molded and the molded product can be heated to be thereby crosslinked. The crosslinking is carried out preferably at a temperature in the range of 120° C. to 200° C., more preferably 140° C. to 180° C. The crosslinking time is usually in the range of about 1 to 120 minutes.

The rubber composition of the present invention gives a rubber vulcanizate exhibiting low heat build-up and having good wet grip property and good abrasion resistance. In view of these properties, the rubber composition is used in various fields, for example, as tread, carcass, sidewall and bead of tires, or hoses, window frames, belts, shoe soles, vibration rubber insulators and automobile parts. The rubber composition can also be used as a resin-reinforced rubber such as high impact polystyrene and ABS resin. Especially, the rubber composition is suitable for tread of low fuel consumption tires, and tread, sidewall, under-tread, carcass and bead of all season's tires, high performance tires and studless tires.

The invention will now be specifically described by the following working examples. Parts and % in the following examples are by weight unless otherwise specified.

Various properties were evaluated by the following methods.

(1) Bound styrene content in a polymer and vinyl bond unit content in butadiene units were measured by $^1$H-NMR.

(2) Weight average molecular weight (Mw) of a polymer was measured by gel permeation chromatography (GPC) and expressed as that in terms of standard polystyrene. For GPC, apparatus "HLC-8020", available from Tosoh Corporation, was used, wherein two columns "GMH-HR-H", available from Tosoh Corporation, were connected in series. Detection was carried out by a differential refractometer "RI-8020" available from Tosoh Corporation.

(3) Coupling percentage was measured by GPC, and determined from the areal difference between the high molecular weight region and the low molecular weight region in an analysis chart.

(4) Mooney viscosity ($ML_{1+4}$, 100° C.) was measured according to JIS K6300.

(5) Abrasion resistance was measured by a Lambourn abrasion tester according to JIS K6264. The abrasion resistance was expressed in terms of index (abrasion resistance index). The larger the index, the better the abrasion resistance.

(6) Wet grip property was expressed in terms of tan δ and modulus of elasticity in torsion (G). Tan δ and modulus of elasticity in torsion (G) were measured by torsion tester "RDA-II", available from Reometric Scientific Inc., under conditions of a twist of 0.5%, a frequency of 20Hz and a temperature of 0° C. These characteristics were expressed in terms of indexes. The larger the index for tan δ (0° C.), the better the wet grip property. The smaller the index for modulus of elasticity in torsion (G) (0° C.), the better the wet grip property.

(7) Heat build-up was expressed in terms of tan δ which was measured by torsion tester "RDA-II", available from Reometric Scientific Inc., under conditions of a twist of 2.5%, a frequency of 10Hz and a temperature of 60° C. This characteristic was expressed in terms of index. The smaller the tan δ index (60° C.), the more satisfactory the low heat build-up.

Further, modulus G'(2.5%) and modulus G'(0.1) were measured under conditions of a twist of 2.5% and 0.1%, respectively, and a frequency of 10 Hz and a temperature of 50° C. Modulus difference ΔG '(2.5–0.1) was calculated by deducting modulus G'(0.1%) from modulus G' (2.5%), and ΔG'was expressed in terms of index. The smaller the index for ΔG', the more satisfactory the low heat build-up.

EXAMPLE 1

An autoclave equipped with a stirrer was charged with 4,000 parts of cyclohexane, 270 parts of styrene, 330 parts of 1, 3-butadiene and 0.37 part of tetramethylethylenediamine (TMEDA). Then 0.3 part of n-butyllithium was added to initiate polymerization at 45° C. (first stage polymerization).

When 15 minutes elapsed from the initiation of polymerization, a mixture of 80 parts of styrene and 320 parts of 1,3-butadiene was continuously added over a period of 60 minutes (middle polymerization stage).

After it was confirmed that the polymerization conversion reached 100%, 5.4 parts of isoprene was added to conduct polymerization for 10 minutes (post polymerization). A part of the polymerization solution was taken from the autoclave.

To the remainder of polymerization solution, 0.11 part of tetramethoxysilane was added to conduct reaction for 30 minutes (coupling reaction). Then methanol was added to the polymerization solution to terminate the reaction to give a polymer solution containing conjugated diene rubber A.

The highest temperature of polymerization system during the polymerization stages was 65° C. Methanol was added to the part of polymerization solution, taken before the coupling reaction, to terminate reaction and then the polymerization solution was dried in the air to give a polymer before the coupling reaction. The weight average molecular weight of this polymer is shown in Table 1.

A part of the polymer solution containing conjugated diene rubber A was taken, and, 0.2 part of 2,4-bis(n-octylthiomethyl)-6-methylphenol as antioxidant, based on 100 parts of the rubber ingredient, was added to the part taken. A solid rubber was recovered from the part of polymer solution by a steam stripping method, and then subjected to rolling for dehydration. Then the solid rubber was dried in a hot air drier to give conjugated diene rubber A. Styrene unit content, vinyl bond content, isoprene unit content, weight average molecular weight and coupling percentage of conjugated diene rubber A were determined. The results are shown in Table 1.

To the remainder of the polymer solution containing conjugated diene rubber A, 0.2 part of 2,4-bis(n-octylthlomethyl)-6-methylphenol as antioxidant, based on 100 parts of the rubber ingredient, and 37.5 parts of "Fukol Flex M" (oil extender, CA 43%, available from Fuji Kosan K. K.), based on 100 parts of the rubber ingredient, were added. A solid rubber was recovered from the polymer solution by a steam stripping method, and then subjected to rolling for dehydration. Then the solid rubber was dried in a hot air drier to give an oil-extended rubber A. Mooney viscosity of oil-extended rubber A was measured. The results are shown in Table 1.

EXAMPLES 2–8 AND COMPARATIVE EXAMPLES 1–5

Oil-extended rubbers B through M were produced by the same procedures as described in Example 1 except that the initially charged monomer composition, the polymerization conditions in the initial polymerization stage, the midway-added monomer composition, the monomer composition added for post polymerization stage, the polymerization conditions in the post polymerization stage, and the kind and amount of coupling agent were changed as shown in Table 1.

Enerthenel 849A (available from British Petroleum Co.; CA: 28%) was used as an oil extender in Example 7 and Comparative Example 4, and NP 700 (available from Idemitsu Kosan K. K.; CA: 19%) was used as an oil extender in Example 8 and Comparative Example 5, instead of Fukol Flex M used in Example 1.

Weight average molecular weight of polymer before coupling, styrene unit content, vinyl unit content, isoprene unit content, weight average molecular weight and coupling percentage of conjugated diene rubbers B through M, and Mooney viscosity of oil-extended rubbers were measured. The results are shown in Table 1.

TABLE 1

| | Examples | | | | |
|---|---|---|---|---|---|
| | 1 | 2 | 3 | 4 | 5 |
| Initial Polymerization Stage | | | | | |
| Initially charged monomer composition (parts) | | | | | |
| Styrene | 270 | 270 | 270 | 270 | 0 |
| 1,3-Butadiene | 330 | 330 | 330 | 330 | 0 |
| Isoprene | 0 | 0 | 0 | 0 | 3 |
| n-Butyllithium | 0.3 | 0.38 | 0.3 | 0.3 | 0.32 |
| TMEDA | 0.37 | 0.42 | 0.37 | 0.37 | 0.44 |
| Polymerization initiation temperature (° C.) | 45 | 45 | 45 | 45 | 50 |
| Polym'n time for Initial stage (min) | 15 | 15 | 15 | 15 | 10 |
| Middle Polymerization Stage | | | | | |
| Midway-added monomer composition (parts) | | | | | |
| Styrene | 80 | 80 | 80 | 80 | 350 |
| 1,3-Butadiene | 320 | 320 | 320 | 320 | 650 |
| Isoprene | 0 | 0 | 0 | 0 | 0 |

TABLE 1-continued

|  | | | | | |
|---|---|---|---|---|---|
| Continuous addition time (min) | 60 | 60 | 60 | 60 | 90 |
| Highest reaction temperature (° C.) | 65 | 65 | 66 | 65 | 65 |
| Post Polymerization Stage | | | | | |
| Isoprene (parts) | 5.4 | 9.3 | 16.3 | 10.9 | 9.7 |
| Polym'n time for post stage (min) | 10 | 10 | 10 | 10 | 10 |
| 1,3-Butadiene (parts) | 0 | 0 | 0 | 8.6 | 0 |
| Polym'n time for Post stage (min) | — | — | — | 10 | — |
| Mw of polymer before coupling (×10$^4$) | 34 | 30 | 34 | 35 | 34 |
| Coupling reaction | | | | | |
| Coupling agent *1 | I | II | I | I | I |
| Amount of coupling agent added (parts) | 0.11 | 0.15 | 0.11 | 0.11 | 0.13 |
| Conjugated Diene Rubber | A | B | C | D | E |
| Content of styrene units (%) | 35 | 35 | 34 | 35 | 35 |
| Content of vinyl bond (%) | 40 | 40 | 41 | 40 | 41 |
| Content of Isoprene units (%) | 0.5 | 0.9 | 1.6 | 1.1 | 1.3 |
| MW of rubber (×10$^4$) | 80 | 78 | 80 | 79 | 80 |
| Coupling percentage (%) | 60 | 75 | 60 | 59 | 60 |
| Oil-Extended Rubber | A | B | C | D | E |
| Mooney viscosity at oil-extended rubber | 50 | 48 | 50 | 49 | 50 |

|  | Examples | | | Comp. Ex. | |
|---|---|---|---|---|---|
|  | 6 | 7 | 8 | 1 | 2 |
| Initial Polymerization Stage | | | | | |
| Initially charged monomer composition (parts) | | | | | |
| Styrene | 270 | 400 | 180 | 270 | 270 |
| 1,3-Butadiene | 330 | 200 | 420 | 330 | 330 |
| Isoprene | 0 | 0 | 0 | 0 | 8.3 |
| n-Butyllithium | 0.3 | 0.23 | 0.31 | 0.3 | 0.3 |
| TMEDA | 0.37 | 0.27 | 0.86 | 0.37 | 0.37 |
| Polymerization initiation temperature (° C.) | 45 | 50 | 40 | 45 | 45 |
| Polym'n time for initial stage (min) | 15 | 20 | 20 | 15 | 15 |
| Middle Polymerization Stage | | | | | |
| Midway-added monomer composition (parts) | | | | | |
| Styrene | 80 | 50 | 70 | 80 | 80 |
| 1,3-Butadiene | 300 | 350 | 330 | 320 | 320 |
| Isoprene | 20 | 0 | 0 | 0 | 8 |
| Continuous addition time (min) | 60 | 60 | 60 | 60 | 60 |
| Highest reaction temperature (° C.) | 86 | 75 | 64 | 65 | 64 |
| Post Polymerization Stage | | | | | |
| Isoprene (parts) | 8.2 | 7.8 | 7.6 | 0 | 0 |
| Polym'n time for post stage (min) | 10 | 10 | 10 | — | — |
| 1,3-Butadiene (parts) | 0 | 0 | 0 | 4.3 | 0 |
| Polym'n time for post stage (min) | — | — | — | 10 | — |
| Mw of polymer before coupling (×10$^4$) | 34 | 41 | 30 | 34 | 34 |
| Coupling reaction | | | | | |
| Coupling agent *1 | I | III | II | I | I |
| Amount of coupling agent added (parts) | 0.11 | 0.15 | 0.14 | 0.11 | 0.11 |
| Conjugated Diene Rubber | F | G | H | I | J |
| Content of styrene units (%) | 35 | 40 | 25 | 35 | 35 |
| Content of vinyl bond (%) | 40 | 25 | 63 | 40 | 40 |
| Content of isoprene units (%) | 2.8 | 0.8 | 0.7 | 0 | 1.6 |
| Mw of rubber (×10$^4$) | 81 | 95 | 80 | 80 | 80 |
| Coupling percentage (%) | 61 | 55 | 75 | 60 | 60 |
| Oil-Extended Rubber | F | G | H | I | J |
| Mooney viscosity of oil-extended rubber | 51 | 65 | 48 | 50 | 50 |

|  | Comparative Examples | | |
|---|---|---|---|
|  | 3 | 4 | 5 |
| Initial Polymerization Stage | | | |
| Initially charged monomer composition (parts) | | | |
| Styrene | 340 | 400 | 180 |
| 1,3-Butadiene | 260 | 200 | 420 |
| Isoprene | 0 | 0 | 0 |
| n-Butyllithium | 0.34 | 0.23 | 0.28 |
| TMEDA | 0.59 | 0.27 | 0.86 |
| Polymerization initiation temperature (° C.) | 45 | 50 | 40 |
| Polym'n time for initial stage (min) | 15 | 20 | 20 |

TABLE 1-continued

| | | | |
|---|---|---|---|
| Middle Polymerization Stage | | | |
| Midway-added monomer composition (parts) | | | |
| Styrene | 90 | 50 | 70 |
| 1,3-Butadiene | 310 | 350 | 330 |
| Isoprene | 0 | 0 | 0 |
| Continuous addition time (min) | 50 | 60 | 60 |
| Highest reaction temperature (° C.) | 66 | 75 | 65 |
| Post Polymerization Stage | | | |
| Isoprene (parts) | 220 | 0 | 0 |
| Polym'n time for post stage (min) | 30 | — | — |
| 1,3-Butadiene (parts) | 0 | 0 | 6 |
| Polym'n time for post stage (min) | — | — | 10 |
| Mw of polymer before coupling (×$10^4$) | 38 | 41 | 34 |
| Coupling reaction | | | |
| Coupling agent *1 | I | III | II |
| Amount of coupling agent added (parts) | 0.13 | 0.15 | 0.11 |
| Conjugated Diene Rubber | K | L | M |
| Content of styrene units (%) | 35 | 40 | 25 |
| Content of vinyl bond (%) | 39 | 25 | 63 |
| Content of isoprene units (%) | 15 | 0 | 0 |
| Mw of rubber (×$10^4$) | 83 | 92 | 80 |
| Coupling percentage (%) | 59 | 54 | 60 |
| Oil-Extended Rubber | K | L | M |
| Mooney viscosity of oil-extended rubber | 49 | 63 | 50 |

*1 Coupling Agent I: Tetramethoxysilane
Coupling Agent II: Tetrachlorosilane
Coupling Agent III: Tetraglycidyl-1,3-bisaminomethylcyclohexane

EXAMPLE 9

In a Brabender mixer having a volume of 250 ml, 137.5 parts of oil-extended rubber A (rubber ingredient content 100 parts), made in Example 1, was masticated for 30 seconds. Then 53 parts of silica (Zeosil 1200MP, available from Rhodia Co.) and 6.4 parts of silane coupling agent (Si69 availabel from Deggusa Co.) were added, and the mixture was mixed for 2 minutes at a starting temperature of 110° C. To the mixture, 27 parts of silica, 2 parts of zinc oxide (zinc flower #1, available from Honjo Chemical Co., particle diameter: 0.4 μm, 2 parts of stearic acid and 2 parts of antioxidant (Nocrac 6C, available from Ohuchi Shinko K. K.) were added, and the mixture was kneaded for 2 minutes. At the termination of kneading, the temperature was 150° C. The kneaded mixture was cooled to room temperature, and again, the mixture was kneaded for 3 minutes at a starting temperature of 110° C. To the kneaded mixture, 1.4 parts of sulfur and a crosslinking accelerator (a mixture of 1.7 parts of N-cyclohexyl-2-benzothiazylsulfenamide and 2 parts of diphenylguanidine) were added, and the mixture was kneaded by an open roll at 50° C. Then the kneaded mixture was press-cured at 160° C. for 30 minutes to give a specimen. Abrasion resistance, wet grip property and low heat build-up of the specimen were evaluated. The results are shown as indexes, as the values obtained in Comparative Example 6 being 100, in Table 2.

EXAMPLES 10–14 AND COMPARATIVE EXAMPLES 6–8

The procedures described in Example 9 were repeated wherein oil-extended rubbers B through F and I through K were used instead of oil-extended rubber A. All other conditions and procedures remained the same. Abrasion resistance, wet grip property and low heat build-up were evaluated. The results are shown as indexes, as the values obtained in Comparative Example 6 being 100, in Table 2.

TABLE 2

| | Examples | | | | | | Comparative Examples | | |
|---|---|---|---|---|---|---|---|---|---|
| | 9 | 10 | 11 | 12 | 13 | 14 | 6 | 7 | 8 |
| Oil extended rubber | A | B | C | D | E | F | I | J | K |
| Amount of isoprene units (%) | 0.5 | 0.9 | 1.6 | 1.1 | 1.3 | 2.8 | 0 | 1.6 | 15 |
| Properties of Rubber Vulcanizate | | | | | | | | | |
| Abrasion resistance (index) | 107 | 112 | 110 | 111 | 110 | 115 | 100 | 103 | 73 |
| Wet grip property | | | | | | | | | |
| tanδ at 0° C. (index) | 105 | 110 | 105 | 109 | 105 | 112 | 100 | 99 | 121 |
| G' at 0° C. (index) | 82 | 83 | 82 | 82 | 77 | 90 | 100 | 102 | 74 |
| Low heat build-up | | | | | | | | | |
| tanδ at 60° C. (index) | 96 | 90 | 95 | 95 | 92 | 96 | 100 | 98 | 132 |
| ΔG' (2.5–0.1) at 50° C. (index) | 84 | 68 | 74 | 70 | 74 | 75 | 100 | 96 | 147 |

As seen from Table 2, a rubber composition (Comparative Example 6) prepared by incorporating silica in an oil-extended rubber of Comparative Example 1 comprising an oil extender and a coupled polymer not containing isoprene units, has poor abrasion resistance and poor wet grip property and exhibits large heat build-up.

A rubber composition (Comparative Example 7) prepared by incorporating silica in an oil-extended rubber of Comparative Example 2 comprising an oil extender and a coupled polymer which contains isoprene units, but, the isoprene units are formed by a process different from that of the present invention and are bonded in random, is somewhat satisfactory in abrasion resistance and low heat build-up as compared with Comparative Example 6, but has poor wet grip property.

A rubber composition (Comparative Example 8) prepared by incorporating silica in an oil-extended rubber of Comparative Example 3 comprising an oil extender and a coupled polymer containing isoprene units in an amount larger than that stipulated in the present invention, has better wet grip property than that of Comparative Example 6, but has poor abrasion resistance and exhibits large heat build-up.

In contrast to these comparative examples, a rubber composition (Examples 9–14) prepared by incorporating silica in an oil-extended rubber of Examples 1–6 comprising an oil extender and a coupled polymer produced by the specific process of the present invention, has good abrasion resistance and good wet grip property and exhibits low heat build-up.

EXAMPLE 16 AND COMPARATIVE EXAMPLE 9

The procedures of Examples 1 and 9 were repeated wherein oil-extended rubber G or L was used, Zeosil 1135MP (available from Rhodia Co.) was used as silica, the amount of Si69 (silane coupling agent) was changed 5.3 parts, and the amount of diphenylguanidin (crosslinking accelerator) was changed to 1.6 parts. All other conditions and procedures remained the same. The evaluation results are shown as indexes, as the values obtained in Comparative Example 9 being 100, in Table 3.

TABLE 3

|  | Ex. 15 | Co. Ex. 9 |
| --- | --- | --- |
| Oil extended rubber | G | L |
| Amount of isoprene units (%) | 0.8 | 0 |
| Properties at Rubber Vulcanizate |  |  |
| Abrasion resistance (index) | 109 | 100 |
| Wet grip property |  |  |
| tanδ at 0° C. (index) | 102 | 100 |
| G' at 0° C. (index) | 88 | 100 |
| Low heat build-up |  |  |
| tanδ at 60° C. (index) | 96 | 100 |
| ΔG' (2.5–0.1) at 50° C. (index) | 88 | 100 |

As seen from Table 3, a rubber composition (Example 15) prepared by incorporating silica in an oil-extended rubber G of Example 7 comprising an oil extender and a coupled polymer produced by the specific process of the present invention is superior in abrasion resistance, wet grip property and low heat build-up to a rubber composition (Comparative Example 9) prepared by incorporating silica in an oil-extended rubber L of Comparative Example 4 comprising an oil extender and a coupled polymer not containing isoprene units.

EXAMPLE 16

In a Brabender mixer having a volume of 250 ml, 110 parts of oil-extended rubber H, prepared in Example 8, and 20 parts of high-cis butadiene rubber (BR1220, available from Zeon Corporation) was masticated for 30 seconds. Then 10 parts of process oil (Fukol M), 40 parts of silica (Zeosil 1165MP, available from Rhodia Co.) and 3.2 parts of silane coupling agent (Si69) were added, and the mixture was mixed for 2 minutes at a starting temperature of 110° C. To the mixture, 40 parts of carbon black N220 (Seast 6, available from Tokai Carbon K. K.), 3 parts of zinc oxide (zinc flower #1), 2 parts of stearic acid and 2 parts of antioxidant (Nocrac 6C, available from Ohuchi Shinko K. K.) were added, and the mixture was kneaded for 2 minutes. At the termination of kneading, the temperature was 150° C. The kneaded mixture was cooled to room temperature, and again, the mixture was kneaded for 3 minutes at a starting temperature of 110° C. To the kneaded mixture, 1.4 parts of sulfur and a crosslinking accelerator (a mixture of 1.7 parts of N-cyclohexyl-2-benzothiazyl-sulfenamide and 0.9 part of diphenylguanidine) were added, and the mixture was kneaded by an open roll at 50° C. Then the kneaded mixture was press-cured at 160° C. for 30 minutes to give a specimen. Properties of the specimen were evaluated. The results are shown as indexes, as the values obtained in Comparative Example 10 being 100, in Table 4.

COMPARATIVE EXAMPLE 10

The procedures described in Example 16 were repeated wherein oil-extended rubber M was used instead of oil-extended rubber H with all other conditions and procedures remaining the same. The evaluation results are shown in Table 4.

TABLE 4

|  | Ex. 16 | Co. Ex. 10 |
| --- | --- | --- |
| Oil extended rubber | H | M |
| Amount of isoprene units (%) | 0.7 | 0 |
| Properties of Rubber Vulcanizate |  |  |
| Abrasion resistance (index) | 108 | 100 |
| Wet grip property |  |  |
| tanδ at 0° C. (index) | 103 | 100 |
| G' at 0° C. (index) | 88 | 100 |
| Low heat build-up |  |  |
| tanδ at 60° C. (index) | 93 | 100 |
| ΔG' (2.5–0.1) at 50° C. (index) | 86 | 100 |

As seen from Table 4, a rubber composition (Example 16) prepared by incorporating silica in an oil-extended rubber H of Example 8 comprising an oil extender and a coupled polymer produced by the specific process of the present invention is superior in abrasion resistance, wet grip property and low heat build-up to a rubber composition (Comparative Example 10) prepared by incorporating silica in an oil-extended rubber M of Comparative Example 5 comprising an oil extender and a coupled polymer not containing isoprene units.

INDUSTRIAL APPLICABILITY

In accordance with the present invention, an oil-extended rubber and a rubber composition comprising the oil-extended rubber are provided. When silica as a reinforcing agent is incorporated in the oil-extended rubber, the resulting rubber composition gives a rubber vulcanizate having high abrasion resistance and high wet grip property and exhibiting low heat build-up. The rubber composition of the present invention is suitable for tread of tire having low fuel consumption.

The invention claimed is:

1. An oil-extended rubber comprising a conjugated diene rubber comprising 30 to 99.9% by weight of 1,3-butadiene units, 0.1 to 10% by weight of isoprene units and 0 to 60% by weight of aromatic vinyl monomer units, and an extender oil; characterized in that the conjugated diene rubber is obtained by a process wherein a monomer mixture comprising at least 80% by weight of 1,3-butadiene based on the total amount of 1,3-butadiene used for polymerization, not larger than 80% by weight of isoprene based on the total amount of isoprene used for polymerization, and at least 80% by weight of an aromatic vinyl monomer based on the total amount of the aromatic vinyl monomer used for polymerization is polymerized by using an organic active metal as an initiator in a hydrocarbon medium; the remainder of isoprene is added to continue polymerization to form a chain portion consisting of isoprene units, then; the remainder of 1,3-butadiene and the remainder of aromatic vinyl monomer are added thereto to continue polymerization; and then, the resulting living polymer having an activated terminal is reacted with a coupling agent.

2. The oil-extended rubber according to claim 1, wherein the coupling agent is a silicon-containing coupling agent or an epoxy group-containing coupling agent.

3. The oil-extended rubber according to claim 1, wherein the conjugated diene rubber has a weight average molecular weight in the range of 200,000 to 2,000,000.

4. The oil-extended rubber according to claim 1, wherein the remainder of isoprene is an amount in the range of 0.2 to 5% by weight based on the total amount of the monomers used for polymerization.

5. The oil-extended rubber according to claim 1, wherein the conjugated diene rubber is such that the amount of a polymer produced by the reaction of two or more molecules of the living polymer with one molecule of the coupling agent is at least 10% by weight based on the total weight of the conjugated diene rubber.

6. The oil-extended rubber according to claim 1, wherein the conjugated diene rubber comprises 45 to 96.8% by weight of 1,3-butadiene units, 0.2 to 5% by weight of isoprene units and 3 to 50% by weight of aromatic vinyl monomer units.

7. The oil-extended rubber according to claim 1, wherein the amount of extender oil is in the range of 5 to 100 parts by weight based on 100 parts by weight of the conjugated diene rubber.

8. A rubber composition comprising the oil-extended rubber as claimed in claim 1.

9. The rubber composition according to claim 8, which further comprises silica.

10. A tire tread comprising the rubber composition according to claim 8.

* * * * *